(12) United States Patent
Tateishi

(10) Patent No.: US 7,652,461 B2
(45) Date of Patent: Jan. 26, 2010

(54) HIGH EFFICIENCY POWER CONVERTER OPERATING FREE OF AN AUDIBLE FREQUENCY RANGE

(75) Inventor: Tetsuo Tateishi, Warwick, RI (US)

(73) Assignee: Texas Instruments Incorporated, Dallas, TX (US)

( * ) Notice: Subject to any disclaimer, the term of this patent is extended or adjusted under 35 U.S.C. 154(b) by 429 days.

(21) Appl. No.: 11/256,869

(22) Filed: Oct. 24, 2005

(65) Prior Publication Data

US 2006/0119340 A1 Jun. 8, 2006

Related U.S. Application Data

(60) Provisional application No. 60/632,921, filed on Dec. 3, 2004.

(51) Int. Cl.
*G05F 1/40* (2006.01)
(52) U.S. Cl. ...................... 323/284; 323/285
(58) Field of Classification Search ................ 323/282, 323/283, 284, 285, 351
See application file for complete search history.

(56) References Cited

U.S. PATENT DOCUMENTS

| | | | |
|---|---|---|---|
| 5,764,495 A * | 6/1998 | Faulk | 363/21.13 |
| 6,212,079 B1 * | 4/2001 | Balakrishnan et al. | 363/21.03 |
| 7,202,609 B2 * | 4/2007 | Langeslag et al. | 315/291 |

* cited by examiner

*Primary Examiner*—Jessica Han
(74) *Attorney, Agent, or Firm*—John J. Patti; Wade J. Brady, III; Frederick J. Telecky, Jr.

(57) ABSTRACT

A DC-DC converter operates outside of an audible frequency range under light current load conditions with reduced switching frequency by reducing supply current and regulating output voltage. A control for the converter maintains the switching frequency above an audible frequency range and reduces supply current by modulating switch on-time, sinking supply current, or permitting negative supply current values. The output voltage of the converter is regulated by modulating switch on-time, clamping output voltage, or modifying feedback detector thresholds. The power converter operates with improved efficiency under light current load conditions, while avoiding operation in an audible frequency range to prevent the generation of audible noise in converter components.

13 Claims, 6 Drawing Sheets

HIGH EFFICIENCY POWER CONVERTER OPERATING FREE OF AN AUDIBLE FREQUENCY RANGE

CROSS-REFERENCE TO RELATED APPLICATIONS

This application claims the benefit of U.S. Provisional Application No. 60/632,921, filed Dec. 3, 2004.

BACKGROUND OF THE INVENTION

1. Field of the Invention

The present invention relates generally to high efficiency power converters for use in supplying a wide range of load current, and relates more particularly to a DC-DC converter that avoids operation in an audible frequency range when supplying loads current.

2. Description of Related Art

High efficiency demands are often placed on power converters, especially DC-DC converters for use in a number of applications. One particular application that produces a broad range of load current demand conditions is in the area of portable equipment products, such as notebook computers. The power demands of portable equipment can change dramatically from moment to moment, due to the focus on power efficiency, extending battery life and reducing power consumption. A number of solutions for portable equipment using DC-DC converters have been proposed, typically focusing on efficiency and handling dramatic changes in load current demands. For example, one way to handle rapidly changing load current demands, while maintaining high efficiency is to skip clock pulses or change switching frequency of the DC-DC converter as a function of load current. As load current demand decreases, more pulses are skipped, or frequency is further reduced resulting in a lower amount of output current.

As apparent switching frequency decreases, it is possible to enter an audible frequency range, resulting in the production of audible output from components of the DC-DC converter. In particular, output components such as inductors or capacitors can be driven at an audible frequency, resulting in audible buzzing or ringing of the components which is highly undesirable in generally, and particularly undesirable in the case of portable equipment.

Referring to FIG. 1, a circuit 10 illustrates the operation of a DC-DC converter according to a conventional design that presents challenges related to operation in the audible frequency range. Circuit 10 is generally efficient in continuous conduction mode related to high current demand through the operation of switches M1, M2 configured in a switching half bridge arrangement. In the case of low current demand, circuit 10 operates in discontinuous conduction mode, and can still maintain a high efficiency as the frequency decreases in a proportional relationship to the load current demand. FIG. 2 illustrates voltage and current weight forms for low current demand with a low switching frequency and discontinuous mode.

As the switching frequency of circuit 10 continues to decrease, it can enter the audible frequency range producing audible sound in external components such as inductor Lx or capacitor Cout. However, if the switching frequency range is limited to be above the audible frequency range, an over voltage condition may be generated where circuit 10 supplies a greater current than is demanded by the load. If the additional current output is shunted, the efficiency of circuit 10 decreases dramatically.

It would be desirable to obtain a DC-DC converter for portable equipment that does not suffer from the drawbacks of the conventional art.

SUMMARY

In accordance with a preferred embodiment of the present invention, there is provided a power converter for portable equipment that has a switching frequency range of operation outside of an audible frequency range. The power converter provides DC-DC power converter operation with current and voltage output limits in relation to the demand from the load application. With low load current demand, as the proportional switching frequency decreases toward a predetermined value, a control is applied to turn on a switch to deliver current to the load. Turning on the switch tends to maintain on the switching frequency of the converter and avoid operation in the audible frequency range. By maintaining a particular switching frequency, output current, and potentially output voltage, increase to induce an over voltage condition. A preferred embodiment of the present invention applies an additional control to regulate or decrease output current and/or voltage.

According to an aspect of a preferred embodiment of the present invention, a timer monitors an interval when a switch is in an off state to determine switching frequency. At the end of the timer interval, a flag is set to indicate that the limits of low frequency operation have been reached. On the basis of the flag indication, the switch is turned on to maintain a desired switching frequency minimum.

According to another aspect of a preferred embodiment of the present invention, increased output voltage or current produced when operating near the low frequency limit is monitored. An on-time of the switch is modified to avoid higher output voltage values, and limit or reduce output current.

According to an advantage of a preferred embodiment of the present invention, the switch on-time control is regulated by a feedback signal from the output voltage with a multiplier. The multiplier permits consistent load regulation in a number of input and output voltage combinations.

According to an embodiment of a preferred embodiment of the present invention, output voltage produced when operating near the low frequency limits is regulated with a clamping circuit. The clamping circuit clamps the output voltage and sinks output current to maintain a regulated voltage while permitting operation of the converter near the low frequency limits.

According to an advantage of a preferred embodiment of the present invention, the clamping circuit is activated when both switches in a switching half bridge configuration are off. By applying the clamping control when both half bridge switches are off, the circuit avoids discharging the output inductor to avoid reducing the efficiency of the power converter.

According to another embodiment of a preferred embodiment of the present invention, there is provided a control for sinking current through the output inductor by allowing negative inductor current. The control operates by modulating a threshold voltage applied to a zero crossing detection comparator, so that a rectifying switch coupled to the inductor may be conducting for a longer time than usual. The longer conduction time allows for circumstances where the inductor current is negative.

According to an aspect of a preferred embodiment of the present invention, a threshold voltage for a zero crossing of a low side switch in a switching half bridge is modified to prevent the low side switch from turning off after reaching an on-time limit. By extending the on-time of the low time switch, current is discharged from the output inductor and the output voltage remains regulated.

In accordance with a preferred embodiment of the present invention, a power converter control for low current load operation is provided. The converter comprises a frequency measuring circuit operable to determine when a switching frequency of the power converter falls to a predetermined value; a switch actuation circuit coupled to the frequency measuring circuit and operable to actuate a switch, based on the determination of the frequency measuring circuit to increase or maintain the switching frequency; an on-time modulator circuit coupled to an output and the switch actuation circuit and operable to limit a length of time the switch is actuated by the switch actuation circuit.

In accordance with another preferred embodiment of the present invention, the frequency measuring circuit further comprises a timer circuit for providing an output indicative of whether an interval between actuation of the switch is greater than a predetermined value.

In accordance with another preferred embodiment of the present invention, the predetermined value is about 20 microseconds or greater.

In accordance with another preferred embodiment of the present invention, the predetermined value is in the range of from about 20 microseconds to about 50 microseconds.

In accordance with another preferred embodiment of the present invention, the on-time modulator circuit is operable to reduce a switch actuation on-time based on a comparison of a voltage feedback with a reference voltage threshold.

In accordance with another preferred embodiment of the present invention, a voltage clamp regulates a power converter voltage output to be at or below a predetermined threshold when the clamp is active.

In accordance with another preferred embodiment of the present invention, a voltage clamp actuation circuit actuates the voltage clamp when the power converter output voltage is greater than or equal to a given threshold value.

In accordance with another preferred embodiment of the present invention, wherein the clamp actuation circuit includes a toggle flip-flop with an output coupled to the clamp circuit.

In accordance with another preferred embodiment of the present invention, wherein the converter further comprises a zero crossing comparator coupled to a rectifying switch for determining when current through the switch is zero; and a threshold shifting circuit coupled to the zero crossing comparator for shifting a threshold of the comparator to permit detection of negative current.

In accordance with another preferred embodiment of the present invention, wherein the shifter circuit permits current to flow into a component coupled to the zero crossing comparator to change a comparative threshold value.

In accordance with another preferred embodiment of the present invention, wherein the component is a resistor.

In accordance with another preferred embodiment of the present invention, a method for operating a DC-DC power converter outside of an audible frequency range, during low current load demand conditions is provided. The method comprises measuring a switching frequency of the power converter; determining if the frequency is below a given threshold value related an audible frequency range: initiating a switching sequence when the switching frequency reaches the threshold to maintain a minimum switching frequency; and compensating the power converter supply current to reduce the supply current or regulate output voltage.

In accordance with another preferred embodiment of the present invention, the step of measuring switching frequency comprises determining a time interval between switching events.

In accordance with another preferred embodiment of the present invention, the method further comprises decreasing a main switch on-time to decrease supply current and regulate output voltage.

In accordance with another preferred embodiment of the present invention, wherein the method further comprises clamping an output voltage with a current sink to reduce supply current and regulate output voltage.

In accordance with another preferred embodiment of the present invention, wherein the method further comprises applying the clamping when converter power switches are off.

In accordance with another preferred embodiment of the present invention, wherein the method further comprises permitting a negative output supply current to reduce supply current and reduce output voltage.

In accordance with another preferred embodiment of the present invention, wherein the method further comprises shifting a threshold of a current detector to permit the current detector to be activated on negative current values.

In accordance with another preferred embodiment of the present invention, a circuit for controlling a DC-DC power converter in light current load conditions is provided. The circuit comprises a feedback circuit coupled to an output of the power converter to detect light current load conditions and reduce switching frequency to reduce converter supply current; a frequency limiter operable to receive an indication of switching frequency and cause a switching event to maintain switching frequency at or above a threshold value; an on-time modulator for modulating on-time of a high side power switch in the converter, the on-time modulator coupled to the feedback circuit and operable to reduce current supply and regulate output voltage.

In accordance with another preferred embodiment of the present invention, wherein the circuit further comprises a voltage clamping circuit coupled to the converter output and controllable to sink supply current to reduce supply current and regulate output voltage.

In accordance with another preferred embodiment of the present invention, wherein the circuit further comprising: an inductor coupled to the power switch; the power switch being a rectifying power switch; and the on-time modulator being operable to modulate the on-time of the rectifying power switch to permit negative inductor current.

Other objects features and advantages of the present invention will be apparent from the detailed description of the invention that follows.

BRIEF DESCRIPTION OF THE DRAWINGS

The invention will be more fully understood with reference to the detailed of the invention, when read in conjunction with the accompanying drawings, in which.

DETAILED DESCRIPTION

The entire contents of U.S. Application No. 60/632,921 is hereby incorporated herein by reference.

A preferred embodiment of the present invention provides a system and technique for avoiding operation at a switching frequency in an audible frequency range. Challenges relating to the regulation of output current and voltage are handled with innovative approaches that maintain a high operational efficiency even at light load currents.

Figure 1:
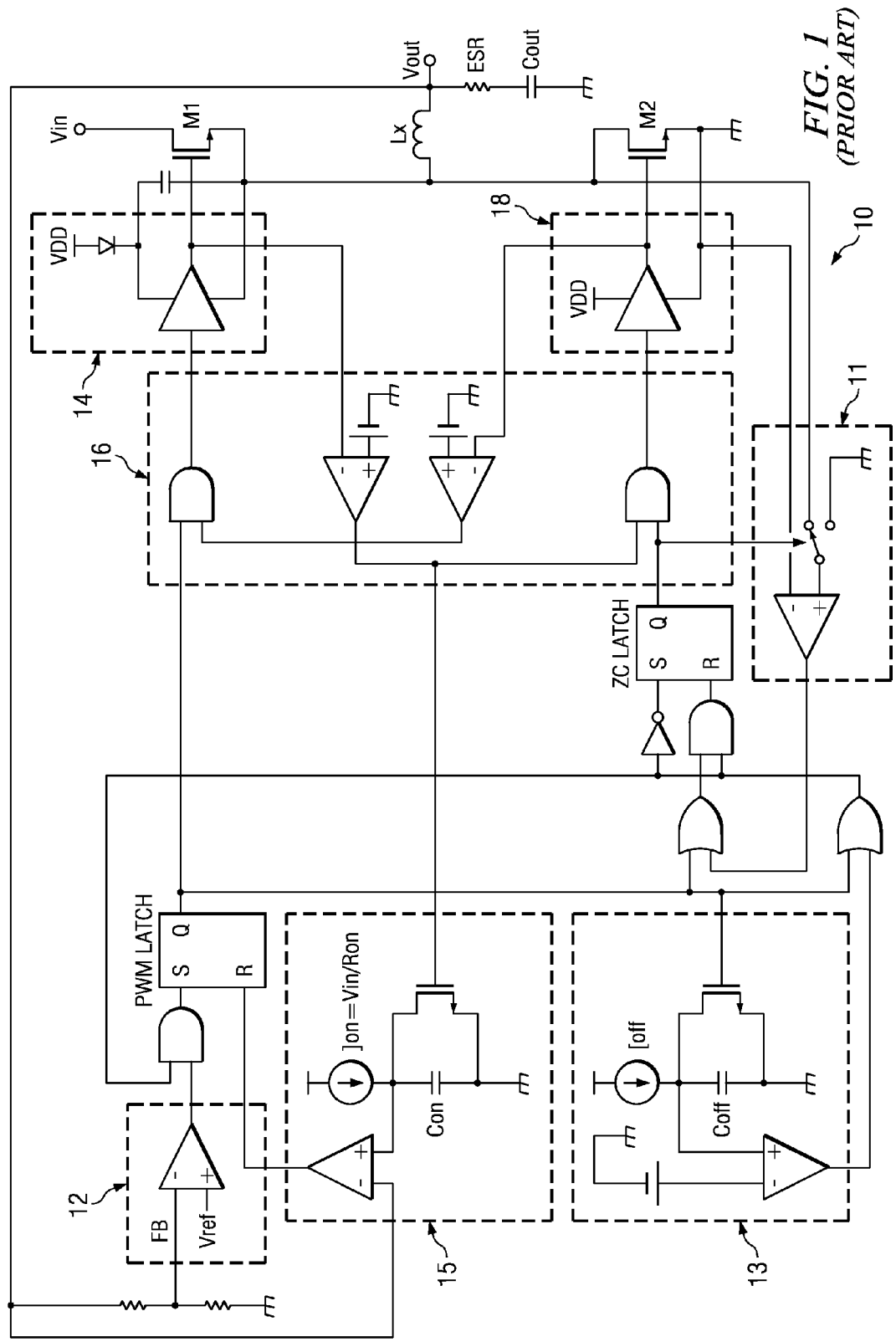
FIG. 1 is a circuit block diagram of a conventional power converter.
Figure 2:
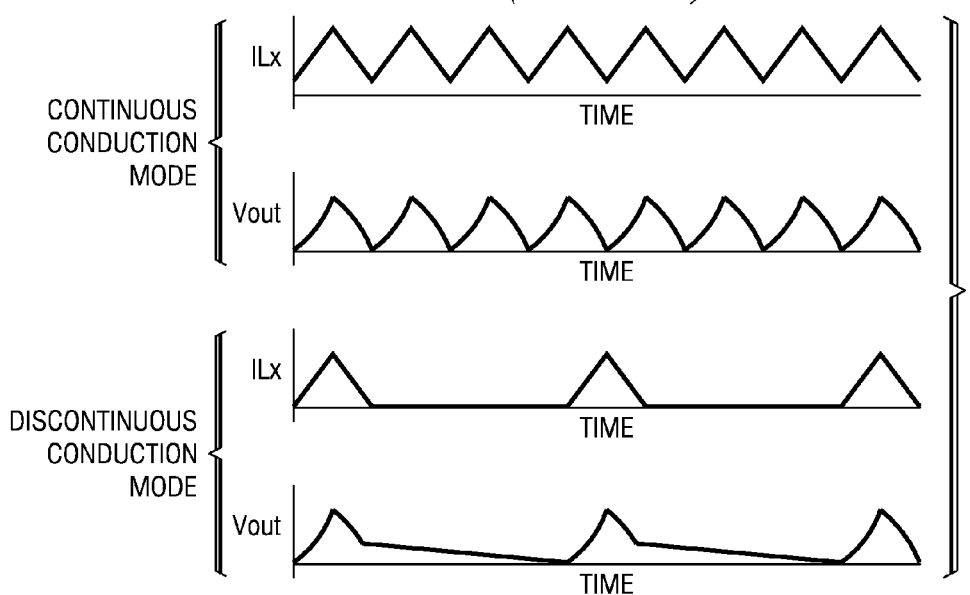
FIG. 2 is a set of graphs illustrating output voltage and current for the converter of FIG. 1.
Figure 3:
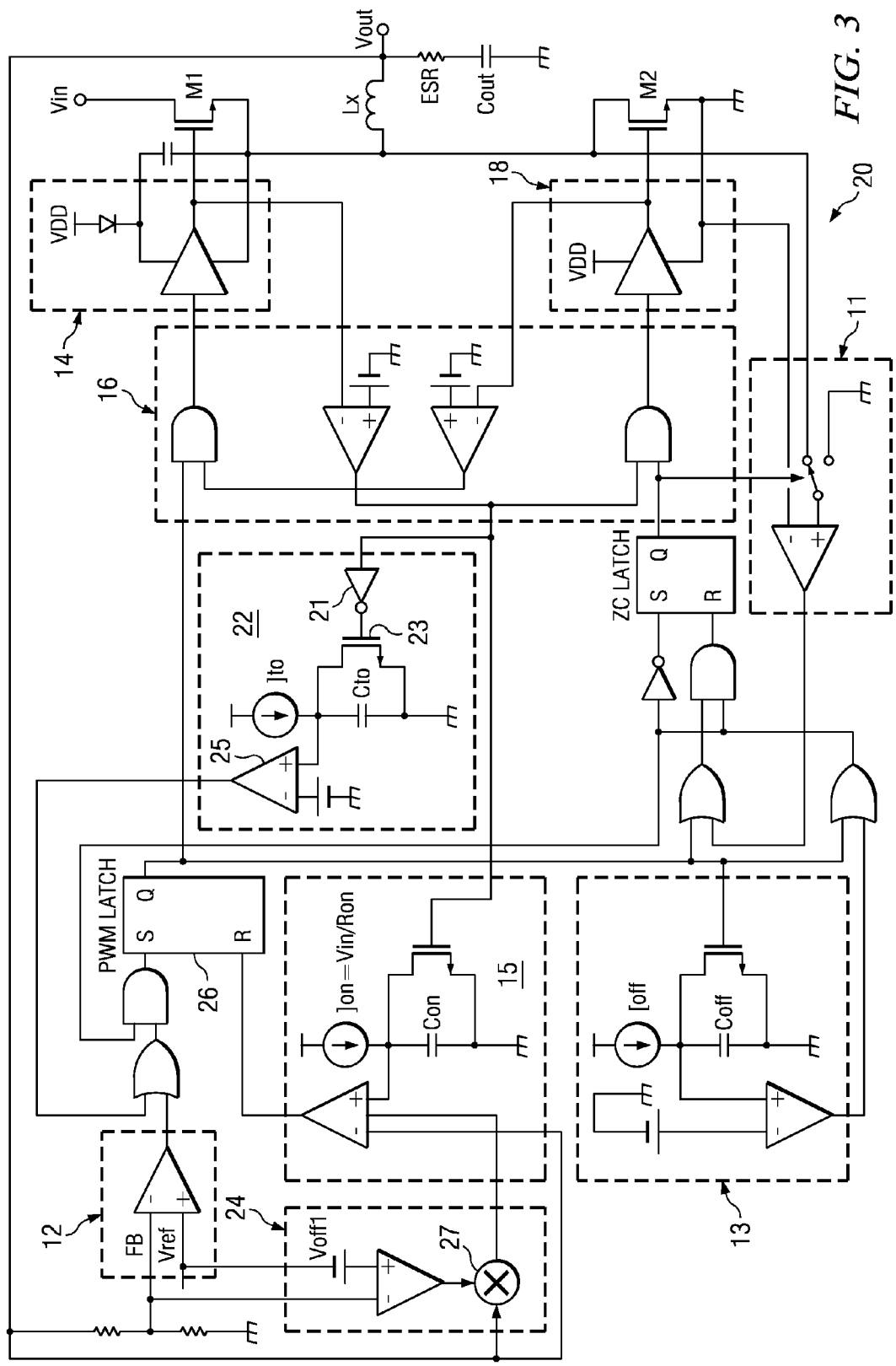
FIG. 3 is a circuit block diagram of a converter according to a preferred embodiment of the present invention.

Referring now to FIG. 3, a circuit block diagram 20 illustrates an embodiment of the power converter according to a preferred embodiment of the present invention. Circuit 20 includes a number of elements that are substantially similar to the conventional DC-DC power converter of FIG. 1. For example, circuit 20 includes zero crossing comparator 11, loop comparator 12, minimum off-time timer 13, on-time timer 15, cross conduction control or controller 16 and high and low side drivers 14 and 18, respectively. In addition, according to a preferred embodiment of the present invention, circuit 20 includes a time-out timer or frequency detector 22 and an on-time shaver or limiter 24. Collectively, the zero crossing comparator 11, loop comparator 12, minimum off-time timer 13, on-time timer 15, cross conduction control 16, PWM latch, ZC latch, intervening logic, the high side driver 14, and low side driver 18 can be referred to as a modulator. Additionally, the loop comparator 12 and logic intervening logic before the PWM latch can be referred to as a feedback circuit.

Timer 22 is generally comprised of a measurement circuit and a comparator 25. the measuring circuit preferably includes an inverter 21 that drives a MOSFET switch 23 coupled across timing capacitor CTO. Inverter 21 is driven by an output signal from cross-conduction control 16, indicative of a state of high side switch M1. When high side switch M1 is off, the input to inverter 21 receives a logic high signal, resulting in switch 23 switching to a high impedance state, which permits timing capacitor CTO to be charged with current source Ito. Accordingly, timer 22 is started when high side switch M1 is turned off. If the voltage on timing capacitor CTO reaches a given threshold value indicated as the input to the inverting side of comparator 25, the output of comparator 25 becomes a logic high, which in turn enables the set input of PWM latch flip-flop 26 side so that high switch M1 can be turned on. Accordingly, time out timer 22 measures an interval of time after high side switch M1 turns off, that is related to a particular switching frequency, indicative of operation near an audible frequency range. An exemplary value for the time internal is 32 μs, so that switching frequency is outside of the audible frequency range.

With the addition of timer 22 in circuit 20, a switching frequency minimum is obtained to avoid operation in an audible frequency range. However, by causing high side switch M1 to turn on at a shorter interval that is indicated by the low level of current demand, additional current is delivered to inductor Lx. The additional current supplied to the output of the switching half bridge increases the output voltage Vout which can lead to an over voltage condition in the output.

In accordance with a preferred embodiment of the present invention, on-time shaver 24 modulates the on-time of high side switch M1 to perform the dual function of permitting current to decrease while regulating output voltage. On-time shaver 24 operates by monitoring output voltage Vout and decreases, or shaves, the on-time of switch M1 if the output voltage becomes higher than a predetermined value. As illustrated in circuit 20, the output voltage value for voltage Vout that activates on-time shaver 24 is equal to reference voltage Vref of loop comparator 12 plus offset threshold voltage Voff1. The cumulative reference voltage is applied to the non-inverting input of the comparator in on-time shaver 24. As the on-time for switch M1 is shaved, or decreased, the current delivered to the output for each cycle of the control becomes smaller. Accordingly, on-time shaver 24 provides an additional feedback loop to regulate output voltage.

On-time shaver 24 includes a multiplier 27 that provides a dynamic range of operation for input and output values. Multiplier 27 can be viewed as a compensator for use of on-time shaver 24 with on-time timer 15, in the event a conversion is needed. That is, on-time timer 15 operates with a feedback from output voltage Vout, which may be on a different scale, or different dynamic range, than that used with on-time shaver 24. Accordingly, multiplier 27 can compensate the output of the comparator in on-time shaver 24 to provide a suitable input for the comparator in on-time timer 15. Multiplier 27 thus provides additional flexibility in the operation of the converter at a frequency that is above the audible frequency range. Multiplier 27 permits approximately the same load regulation for all input and output combinations. However, it should be apparent that circuit 20 can be configured to operate without multiplier 27, such that on-time shaver 24 simply indicates when high side switch M1 should be turned off by appropriately resetting PWM latch flip-flop 26.

Figure 4:
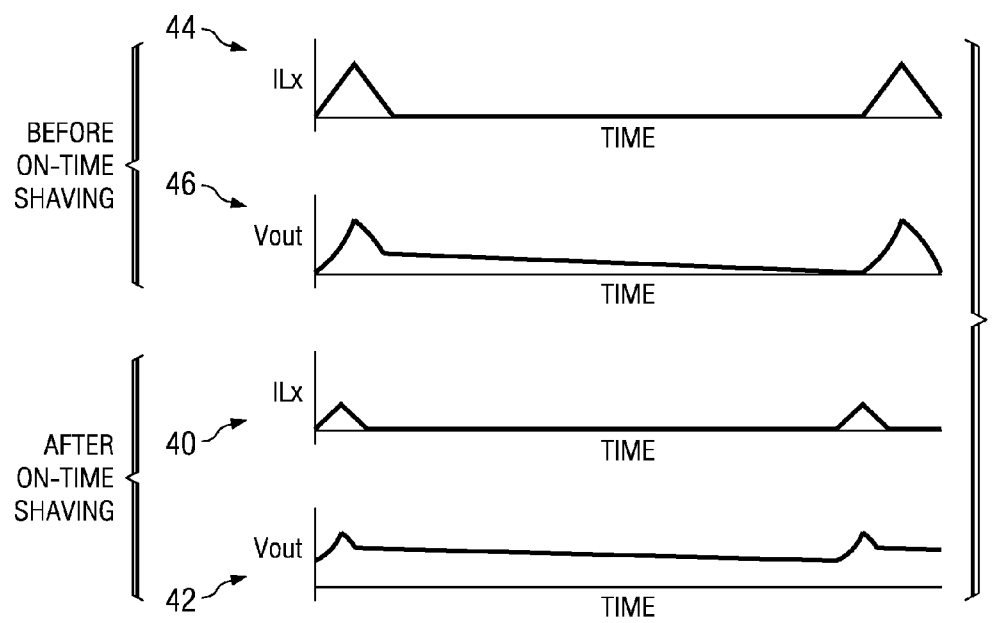
FIG. 4 is a set of graphs showing output voltage and current way forms relating to the circuit of FIG. 3.

Referring now to FIG. 4, two sets of graphs illustrating output voltage and current for circuit 20 are illustrated. Graphs 44 and 46 illustrate operation of circuit 20 with time-out timer 22 being active to prevent the switching frequency from falling into the audible frequency range. Graph 46 indicates high peak voltages on the output due to the high currents seen in graph 44. The high currents in graph 44 and the high peak voltages in graph 46 are the result of turning high side switch M1 on early to avoid operation in a lower frequency range.

Graphs 40 and 42 of FIG. 4 illustrate operation of circuit 20 with on-time shaver 24 being active. As can be seen in graph 40, the output current is greatly reduced as are the peak voltages in graph 42. Thus, the goals of reducing current, while regulating output voltage is achieved.

Figure 5:
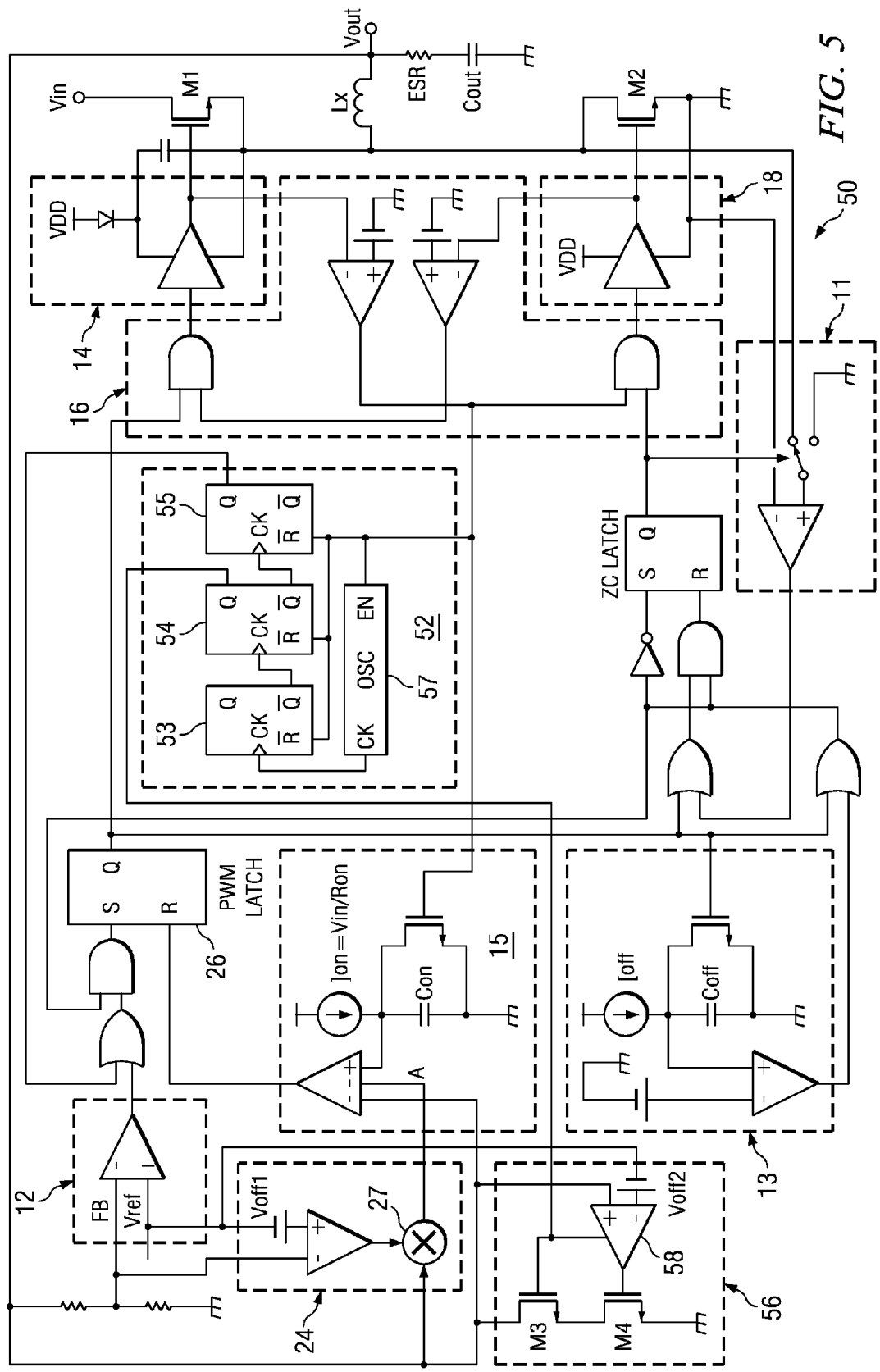
FIG. 5 is a circuit block diagram of a power converter according to another embodiment of the present invention.

Referring now to FIG. 5, another embodiment according to a preferred embodiment of the present invention is illustrated generally as circuit 50. Circuit 50 prevents operation of the power converter in an audible frequency range and also accommodates situations in which the load current demand becomes very small. When the control of the converter illustrated in circuit 50 prevents operation in the audible frequency range, supply current may increase, producing a corresponding output voltage increase. As the on-time of switch M1 is reduced according to the embodiment illustrated in FIG. 3, output current can be reduced while output voltage is regulated. However, as load current becomes very small, the limitations of the on-time of switch M1 prevents the on-time from becoming less than a particular value. For example, the on-time may be limited by the response time of switch M1 formed as a semiconductor device. Accordingly, since a shorter on-time may not be available due to a minimum on-time constraint, the output voltage increases as a result of when load current demand becomes very small.

In accordance with the control illustrated in circuit 50, an over voltage in the presence of low current demand is detected in an over voltage (OV) clamp circuit 56. OV clamp circuit 56 includes two n-channel MOSFETs M4, M 4 arranged in a stacked configuration and are connected to the power converter output node. When switches M4, M 4 are both conducting, they sink current from the output of circuit 50 to reduce output current and provide output voltage regulation for very low load current demand. Switch M4 is operated by the output of a toggle flip-flop 54, arranged in a series of toggle flip-flops in time-out timer circuit 52. Timer circuit 52 is enabled when high side switch M1 is turned off, at which point oscillator 57 is activated to propagate a pulse through toggle flip-flops 53-55. As switch M4 becomes activated, clamp circuit 56 can respond to over voltage output conditions by causing switch M 4 to conduct to sink output current to reduce output voltage. Clamp circuit 56 includes an op-amp 58 with a reference voltage applied to the inverting input terminal to detect when a converter output voltage exceeds the given threshold value. The reference voltage is represented by offset reference voltage Voff 2 plus reference voltage Vref. Once the converter output voltage exceeds offset reference voltage Voff 2 plus reference voltage Vref, switch M 4 conducts and clamp circuit 56 sinks current from the converter output to reduce output voltage and maintain a regulated voltage output.

Time-out timer 52 also acts to turn on high side switch M1 after a particular time interval has passed, to avoid operation in an audible frequency range. Toggle flip-flop 55 provides the enable for setting PWM latch flip-flop 26 to cause the output of flip-flop 26 to become a logic high level, turning on switch M1. Accordingly, toggle flip-flop 54 enables clamp circuit 56 before the time out for operation in an audible frequency range occurs. Preferably, toggle flip-flop 54 enables clamp circuit 56 when both switches M1, M2 are off to avoid additional voltage discharge that may lower converter efficiency. That is, it is preferable to sink current out of the converter output when both switches M1 and M2 are in a non-conducting state to avoid additional output component discharge that would lower converter efficiency. In addition, the reference voltage applied to the inverting input of op-amp 58 in clamp circuit 56 is equal to the total of reference voltage Vref plus offset reference voltage Voff 2, which determines when clamp circuit 56 is activated. Voff 2 is preferably higher than first offset voltage Voff 1, related to time shaving. As such, the clamping circuit is activated after the on-time shaver has been activated.

Figure 6:
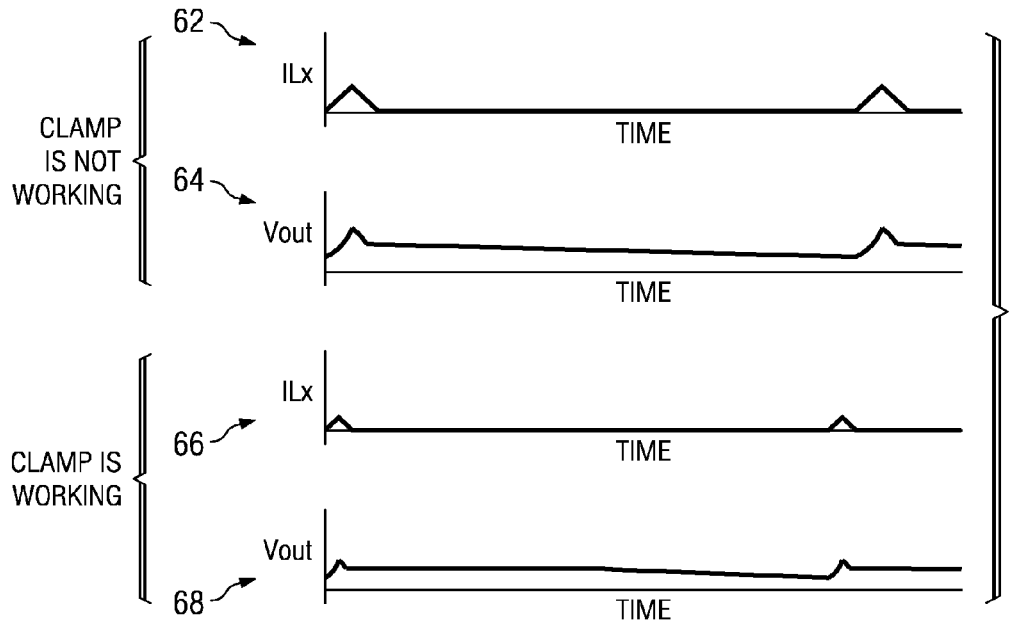
FIG. 6 is a set of graphs showing output current and voltage wave forms related to the circuit of FIG. 5.

Referring to FIG. 6, a number of current and voltage waveforms are illustrated that show how clamp circuit 56 impacts the converter output. In graphs 62 and 64, the inductor current and output voltage in a low current load demand situation are illustrated. As can be seen from graphs 62 and 64, the inductor current ILx is somewhat large, even with a low load current demand, and output voltage Vout has high peak values. Graphs 62 and 64 illustrate the output of circuit 50 in a low current load demand state, when clamp circuit 56 is inactive.

Graphs 66 and 68 illustrate inductor current ILx and output voltage Vout, respectively, in a low current load demand state, when clamp circuit 56 is active. As can be seen from graph 66 inductor current ILx is greatly reduced over substantially the same switching interval. In addition, output voltage Vout is clamped to the voltage value represented by the sum of voltage references Vref and Voff 2. Graph 68 also illustrates how the clamp is applied on the output voltage after the passage of a particular interval, which is related to the activation of the non-inverting output of toggle flip-flop 54 to enable clamp circuit 56. In addition, the clamp on the output voltage is released once the output voltage drops below the given threshold value related to operation of clamp circuit 56. Graph 68 illustrates how output voltage is regulated using clamp circuit 56 and time-out timer circuit 52 in the case of very low current load demand situations.

Referring for a moment to FIG. 3, the role of zero crossing comparator circuit 11 is to monitor the output node of the switching half bridge composed of switches M1 and M2, and turn off low side switch M2 when the node voltage is zero. Turning off switch M2 when the node voltage is zero prevents negative inductor current in the output. Circuit 11 thus provides a technique for operating the power converter in discontinuous conduction mode.

Figure 7:
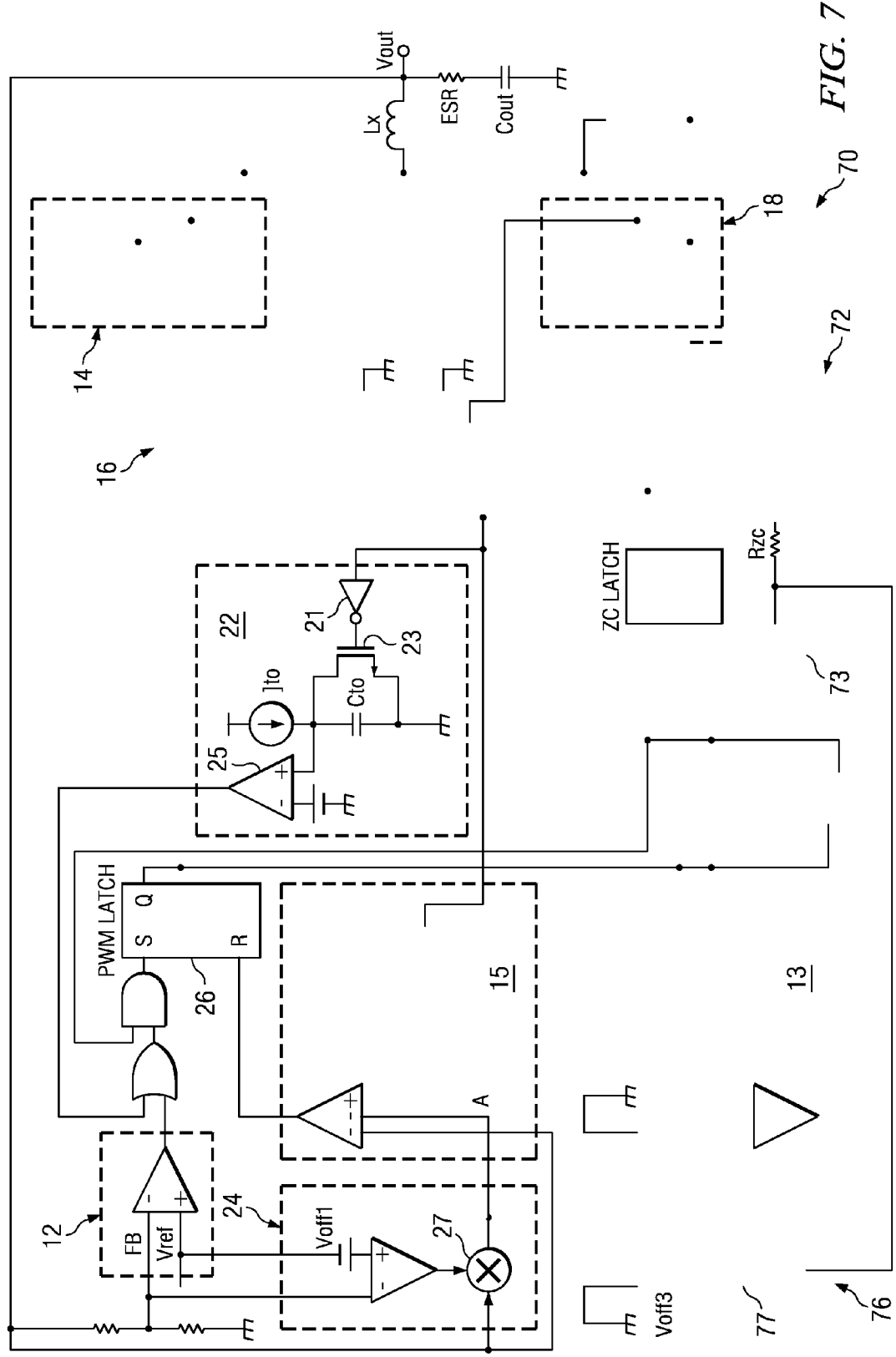
FIG. 7 is a circuit block diagram of a power converter according to another embodiment of the present invention.

Referring now to FIG. 7, another embodiment of a preferred embodiment of the present invention is illustrated as circuit 70. Circuit 70 is similar to the embodiment of FIG. 3, with threshold shifting circuitry added. A modified zero crossing comparator circuit 72 achieves the same function as circuit 11, but can also have a shifted reference threshold in the event that load currents become very small. As discussed above, very small load currents tend to cause the converter to operate at a switching frequency outside the audible frequency range in accordance with a preferred embodiment of the present invention, which tends to cause the on-time of switch M1 to be shortened to maintain proper voltage regulation with reduced current output. A zero crossing shifter circuit 76 is activated when the on-time for switch M1 is reduced beyond a predetermined time, to change the threshold voltage of zero crossing comparator circuit 72. The predetermined time can be related to switch response time limitations, for example. Zero crossing shifter circuit 76 permits current to flow from its output through resistor Rzc once the on-time for switch M1 reaches a minimum on-time threshold. The current flow and subsequent threshold modulation reduces average current delivered to the output and regulates output voltage. Shifter circuit 76 monitors node A, which is the output of multiplier 27 in on-time shaver 24. The voltage value of node A is applied to the inverting input of an amplifier, such as a source only transconductance amplifier 77 in shifter circuit 76. Offset reference voltage Voff 3 provides a reference voltage to the non-inverting input of amplifier 77, and serves as a threshold for determining when the threshold of zero crossing comparator circuit 72 should be shifted. Accordingly, when the voltage on node A is less than reference voltage Voff3, amplifier 77 begins sourcing current to the inverting input of the comparator in zero crossing comparator circuit 72. As current flows through resistor Rzc, the apparent ground point reference for comparator 73 rises above zero or ground potential. Accordingly, the output of comparator 73 is not activated until the voltage across M2 rises to the new, lower threshold value. The implication for operation of the circuit is that negative inductor current is allowed for some period of time before low side switch M2 turns off. When high side switch M1 turns on, the switching node between switches M1 and M2 returns to input voltage Vin, which causes the inductor current to begin reversing and eventually become zero. It should be apparent that any type of component can be used in place of resistor Rzc, including passive components such as capacitors or inductors, or active components such as switches, including MOSFETs, or diodes, or any combination of the above.

Figure 8:
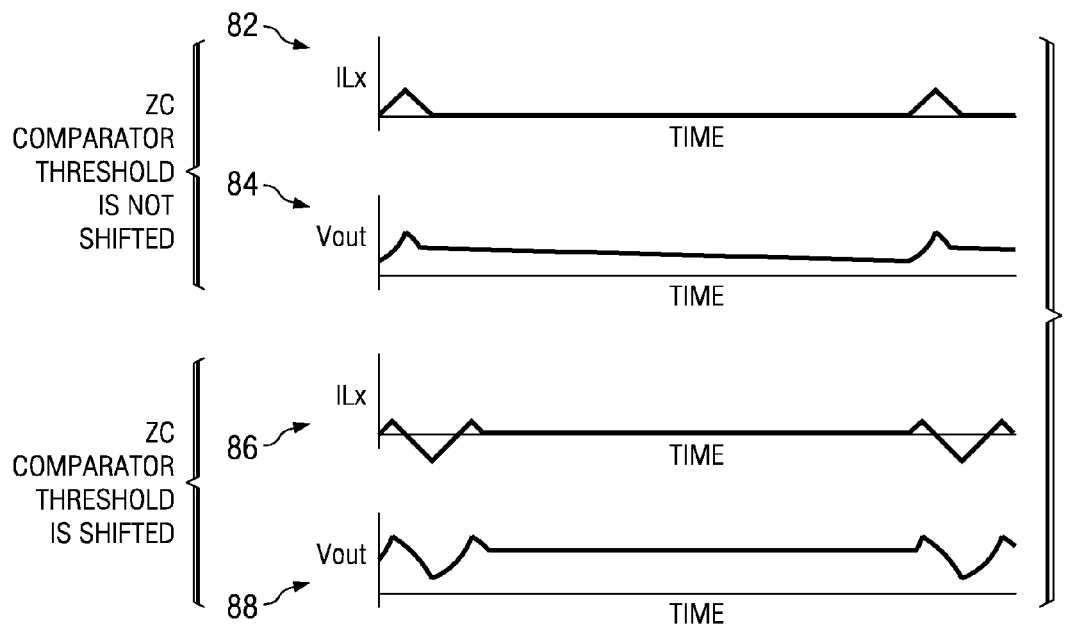
FIG. 8 is a set of graphs showing output voltage and current weight forms related to the circuit of FIG. 7.

Referring now to FIG. 8, the voltage, and current graphs for operation of circuit 70 in low current load conditions are illustrated. Graphs 82 and 84 illustrate current and voltage for circuit 70 when zero crossing shifting circuit 76 is inactive and the threshold applied to the inverting input of comparator 73 remains zero. Current graph 82 shows that the current remains above zero, in keeping with a comparator threshold of zero in zero crossing comparator circuit 72. Similarly, the voltage output in graph 84 has high peak voltages. The current illustrated in graph 82 is greater than that desired for low current load demand situations.

When zero crossing shifting circuit 76 is active, the threshold of comparator 73 can be shifted in low current load conditions to permit switch M2 to remain on longer, when a minimum on-time limitation has been reached for high side switch M1. Activation of zero crossing shifter circuit 76 permits inductor current to become negative and limits the amount of current supplied to the load in the low current load condition, as can be seen in graph 86. Graph 88 illustrates regulated output voltage with smaller peak variations. Accordingly, the embodiment of the present invention illustrated in circuit 70 provides a control for low load current demand, without moving the switching frequency into the audible frequency range, even when the limits of on-time for switch for M1 have been reached. By permitting the threshold of comparator 73 to be changed, by sourcing current through resistor Rzc, the on-time for switch M1 can be kept equal to or higher than a minimum limitation, while reducing supply current and maintaining a regulated voltage output.

In general, a preferred embodiment of the present invention reduces switching frequency on light current load conditions to the point where the switching frequency is near the audible frequency range, meaning a switching interval of approximately 32 microseconds for both switching MOSFETs. When the switching frequency of the converter approaches an audible frequency range, a switching frequency outside of the audible frequency range is maintained, even if the output voltage is higher than a target value. Since the output voltage tends to be higher according to this technique, the power converter control compensates for overvoltage conditions and modulates the on-time of a high side switch in the switching half bridge to maintain the output voltage at a particular level. For example, the output voltage may become 1% higher than normal light load operation to prevent operation in the audible frequency range. When the converter control has a feedback amplifier and is operated in a current mode, the output voltage can be maintained at approximately the desired level through the additional influence applied by the gain of a feedback amplifier in the current control loop.

A power converter controller in accordance with a preferred embodiment of the present invention produces greater efficiency than previous power converters operating outside an audible frequency range in low current load conditions. Table 1 below illustrates relative efficiency levels for low current loads during operation at frequencies outside of an audible frequency range.

TABLE 1

| Load (MA) | Converter Described Herein | Prior Converters |
|---|---|---|
| 1 mA | 35% | 10% |
| 5 mA | 70% | 35% |
| 10 mA | 79% | 50% |
| 30 mA | 86% | 70% |

Although the present invention has been described in relation to particular embodiments thereof, other variations and modifications and other uses will become apparent to those skilled in the art from the description. It is intended therefore, that the present invention not be limited not by the specific disclosure herein, but to be given the full scope indicated by the appended claims.

What is claimed is:

1. An apparatus having an output, the apparatus comprising:
   a switch that is adapted to be coupled to a load;
   a frequency detector operable to determine when a switching frequency falls to a predetermined value;
   a modulator is coupled to the frequency detector and to the switch, wherein the modulator is operable to actuate the switch, based on the determination of the frequency detector to increase or maintain the switching frequency;
   a limiter coupled to the output and to the modulator, wherein the limiter is operable to limit a length of time the switch is actuated by the modulator, and wherein the limiter includes:
      a comparator that receives the output and a reference voltage; and
      a multiplier that receives the output of the comparator and the output.

2. The apparatus according to claim 1, wherein the predetermined value is about 20 microseconds or greater.

3. The apparatus according to claim 1, wherein the limiter is operable to reduce the switch actuation on-time based on a comparison of the output with a reference voltage threshold.

4. The apparatus according to claim 1, wherein the frequency detector further comprises:
   a current source;
   a capacitor coupled to the current source; and
   a charging switch coupled in parallel to the capacitor, wherein the charging switch enables the current source to charge the capacitor when the switch is off.

5. An apparatus having an output voltage comprising:
   a switch that is adapted to be coupled to a load;
   a modulator that receives a reference voltage and an output voltage and that outputs an actuation signal to the switch at a first frequency;
   a measuring circuit that is coupled to the modulator to measure at least a portion of the actuation signal, wherein the measuring circuit outputs a measured value;
   a comparator that receives the measured value and a threshold value and that outputs a first control signal to the modulator, wherein the comparator increases the first frequency if it falls below a predetermined value; and
   a limiter that receives the reference voltage and the output voltage and that outputs a second control signal to the modulator so as to limit the output voltage.

6. The apparatus according to claim 5, wherein the predetermined value is about 20 microseconds or greater.

7. The apparatus according to claim 5, wherein the limiter is operable to reduce a switch actuation on-time based on a comparison of the output of the power converter with a reference voltage threshold.

8. The apparatus according to claim 5, wherein the measuring circuit further comprises:
   a current source;
   a capacitor coupled to the current source; and
   a charging switch coupled in parallel to the capacitor, wherein the charging switch enables the current source to charge the capacitor when the switch is off.

9. The apparatus according to claim 5, wherein the limiter further comprises:
   a comparator that receives the output and a reference voltage; and a multiplier that receives the output of the comparator and the output.

10. A DC-to-DC converter comprising:
an inductor that outputs an output voltage;
a switch that is coupled to the inductor;
a driver that is coupled to the switch and that provides an actuation signal to the switch so as to actuate the switch at a first frequency;
a controller that is coupled to the driver and that generates a first control signal;
a frequency detector that is coupled to the controller and that receives the first control signal, wherein the frequency detector outputs a second control signal, and wherein the frequency detector increases the first frequency if it falls below a predetermined value;
a timer that is coupled to the controller and that generates a timing signal;
a limiter that receives a reference voltage and the output voltage and that outputs a third control signal to the timer;
a feedback circuit that receives the reference voltage, the output voltage, and the second control signal; and
a latch that is coupled to the controller, the feedback circuit, and the timer.

11. The apparatus according to claim 10, wherein the predetermined value is about 20 microseconds or greater.

12. The apparatus according to claim 10, wherein the frequency detector further comprises:
a current source;
a capacitor coupled to the current source; and
a charging switch coupled in parallel to the capacitor, wherein the charging switch enables the current source to charge the capacitor when the switch is off.

13. The apparatus according to claim 10, wherein the limiter further comprises:
a comparator that receives the output and a reference voltage; and
a multiplier that receives the output of the comparator and the output.

* * * * *

UNITED STATES PATENT AND TRADEMARK OFFICE
CERTIFICATE OF CORRECTION

PATENT NO.      : 7,652,461 B2
APPLICATION NO. : 11/256869
DATED           : January 26, 2010
INVENTOR(S)     : Tetsuo Tateishi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Twenty-eighth Day of December, 2010

David J. Kappos
*Director of the United States Patent and Trademark Office*